United States Patent [19]

Howard et al.

[11] Patent Number: 4,529,672
[45] Date of Patent: Jul. 16, 1985

[54] PROCESS OF MAKING ELECTROCHEMICAL ELECTRODES AND ELECTRODES MADE THEREBY

[75] Inventors: Ronald A. Howard; Paul S. Sirocky, both of Brook Park, Ohio

[73] Assignee: Union Carbide Corporation, Danbury, Conn.

[21] Appl. No.: 480,619

[22] Filed: Mar. 29, 1983

[51] Int. Cl.³ .............................................. H01M 4/86
[52] U.S. Cl. ..................... 429/42; 429/217; 156/312; 252/182.1
[58] Field of Search ................. 156/312; 29/469.5; 429/218, 27, 42, 217; 252/182.1

[56] References Cited

U.S. PATENT DOCUMENTS

| | | | |
|---|---|---|---|
| 3,158,510 | 11/1964 | Talvanheimo | 429/218 |
| 3,594,236 | 7/1971 | Boden et al. | 252/182.1 |
| 3,647,617 | 3/1972 | Rieke et al. | 156/312 |
| 4,152,489 | 5/1979 | Chottiner | 429/27 |
| 4,370,284 | 1/1983 | Soloman | 264/42 |

Primary Examiner—Anthony Skapars
Attorney, Agent, or Firm—Cornelius F. O'Brien

[57] ABSTRACT

A process for making an improved electrode by providing on a conductive current distributor layers of active and hydrophobic materials, uniting these materials together with sufficient force to lock them together and subsequently roll-bonding the resulting preformed assembly to form the finished electrode.

8 Claims, 1 Drawing Figure

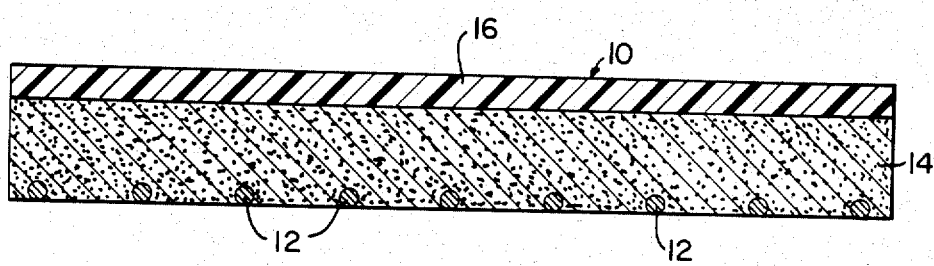

PROCESS OF MAKING ELECTROCHEMICAL ELECTRODES AND ELECTRODES MADE THEREBY

FIELD OF THE INVENTION

The present invention is in the field of electrochemical cell electrodes. More specifically, the present invention is in the field of air-depolarized cathodes.

STATEMENT OF THE PRIOR ART

Considering only porous air-depolarized cathodes, these cathodes usually consist of at least two layers: a current collector, which may be a wire mesh screen or a similar conductive framework, and an active layer wherein the desired electrochemical reaction takes place. Additional layers often include a wetproofing layer made with a high concentration of a hydrophobic material such as polytetrafluoroethylene or other suitable polymers.

These layers are self bonding if enough pressure is applied by pressing or rolling. Rolling several layers together presents a variety of problems, most of which result in one's not being able to keep the layers in proper alignment. Pressing an electrode of large area has the disadvantage of requiring large presses capable of exerting many tons of force to achieve sufficient bonding. Also, the uniformity of the electrode layers and of the platen surfaces of the press under pressing conditions are important variables that are difficult to control.

The wetproofing layer may contain pore formers that are removed after processing to produce fine porosity in the layer as is taught in U.S. Pat. No. 3,594,236. Similarly, the active layer as well as the wetproofing layer may contain pore formers as taught in U.S. Pat. No. 4,370,284.

The layers of cathodes are normally pressed together between platens in a hydraulic press or they are rolled together in a roll mill. When large area cathodes are required for industrial applications, both laminating methods have limitations. For the pressing method, extremely high tonnage presses are required and with this type of press, the uniformity of the pressing decreases because of elastic deflection of the equipment at high pressure. The limitation of the roll bonding method is mainly in the uniformity of the layers being bonded. These layers will always have some variation in thickness or density. When long pieces of cathode are rolled with these variations, the layers will not lay in a straight line during rolling and the quality of the product will decrease.

OBJECTS AND SUMMARY OF THE INVENTION

The principal object of this invention is to provide an article of this character which combines simplicity, strength and durability in a high degree, together with inexpensiveness of construction.

Another important object is to provide a method of bonding the layers of a large cathode that can be adapted to production and which gives high quality, uniform permeability cathodes in which the layers are well bonded together.

Other objects of this invention will in part be obvious and in part hereinafter be pointed out.

In summary, the invention resides in a process for making an improved electrode by providing on a conductive current distributor layers of active and hydrophobic materials, uniting these materials together with a force the need not be greater than that sufficient to lock them together, and subsequently roll-bonding the resulting preformed assembly to form the finished electrode. This two-stage process improves the bond strength between the layers and improves the uniformity of both the permeability and the bond strength of the layers.

BRIEF DESCRIPTION OF THE DRAWING

The single FIGURE in the drawing is a cross section of an electrode of the invention.

DETAILED DESCRIPTION OF THE DRAWING

With reference to the drawing, there is shown an electrode constructed in accordance with the principles of the invention and designated generally by reference character 10. The electrode 10 includes a metal screen current distributor 12, a layer 14 of active material such as carbon, and hydrophobic layer 16 suitably of polymeric and hydrophobic material such as polytetrafluoroethylene (PTFE).

In the practice of the invention, the metal screen or grid 12 may consist of various metals or alloys including nickel, silver, copper, stainless steel, iron, steel, and the like, and also the preceding metals plated with nickel or gold, silver, platinum, or other noble metals.

The active material 14 may consist of materials including carbon, activated carbon, catalysts, a pore former, and an appropriate binder.

The hydrophobic layer 16 may consist, in addition to that specified above, of polyethylene or polypropylene, or carbon mixed with such polymeric materials.

In the process of the invention, the two-stage laminating of these layers is accomplished by first laying up the screen, the active carbon layer, and the hydrophobic layer in a hydraulic press capable of applying a pressure of one-tenth to five tons per square inch based on the face area of the cathode. The layers are pre-pressed and set into place with sufficient force only to lock all three layers together. The pre-pressed cathode structure is then roll-bonded on a constant pressure rolling mill. By "roll-bonding" is meant the technique of passing the sheet-like prepressed stacked layers through the nip of a roll mill, which consists of counter-rotating rolls that are substantially cylindrical in shape and can exert line force pressures of from 0.1 to 10 tons per linear inch.

In a modification of the process of the invention, the two-stage pressing and roll-bonding is altered by roll-bonding more than one time. This may be done with the intent to work the material gradually down so a specified disbond strength can be achieved. Thus, one obtains an average disbond strength of 7 psi by roll-bonding only once. Roll-bonding a second time will increase the average disbond strength to 15 psi. In practice and depending upon the end use, cathodes having disbond strengths ranging from nearly zero to about 50 psi can be made. By "disbond strength" is meant the hydraulic pressure required to separate the active layer from the current collector, wherein the hydraulic fluid is water and the test is conducted at room temperature.

Permeability is also influenced by the two stage process of this invention as increased rolling by using either higher pressure or multiple roll-bonding will decrease the permeability but will also produce the benefit of making the permeability more uniform across a large sheet. In practice, a compromise is struck between uniformity of properties and the level of the properties.

In the present process, the use of constant gap rolls achieves a similar effect but with less uniformity than with constant pressure rolls.

The invention is further illustrated in a non-limited manner by the following examples.

EXAMPLES

In this example, a number of cathodes consisting of a silver plated nickel grid, finely divided activated carbon and PTFE were made by the prior art technology and by the process of this invention.

The pressed layer structure prepared according to the prior art showed variations in the disbond strength and permeability over a large range. The two-stage process of the invention increases the average disbond strength between the layers and, more importantly, it also improves the uniformity over the entire structure.

Typical disbond strength variation in a pressed cathode shows a variation of 16 psi. After roll bonding a variation of 5 psi is achieved. This improved uniformity is also seen in the variation in permeability with variation in pressed cathodes of 8 ml/min/cm$^2$ at 15 cm of Hg, with individual values ranging from 5 to 21 ml/min/cm$^2$. A variation of 5 ml/min/cm$^2$ at 15 cm of Hg, with individual values ranging from 12 to 17 ml/min/cm$^2$, is achieved after roll bonding. In this permeability test, dry nitrogen at an inlet pressure of 150 Torr above atmospheric pressure is passed through the sample and vented to atmospheric pressure. The flow rate is measured and is divided by the superficial flow area to obtain the reported value. In practice, cathodes having a measured permeability ranging from less than 1 ml/min/cm$^2$ to about 400 ml/min/cm$^2$ may be found useful, depending upon the end use.

Analysis of the data obtained with the above samples showed that many of the problems experienced in the rolling operation are eliminated if the electrode is pressed before rolling. The product from such a combination of operations is different from that of only pressing in that the materials are more tightly bonded, as indicated by increased disbond strengths. Further, lower pressures can be used in the pressing operation to make a "preform" followed by a rolling operation that creates the high pressures required to tightly bond the layers to one another. Thus, an increase in cathode area need not create the need for a higher capacity press.

An added unexpected benefit derived from the combination of processes is that of improved product uniformity as evidenced by greater uniformity in both disbond strength and porosity, i.e., gas flow rate through the finished electrode.

The article of the invention has been thoroughly tested under actual use conditions and has been found to be completely successful for the accomplishment of the above-stated objects of the invention. It is believed that the operation and use of the invention hereinabove described will be evident to those skilled in the art to which it relates from a consideration of the foregoing.

We claim:

1. A process for making an electrode comprising the steps:
   (a) providing an electrochemically active material;
   (b) providing a hydrophobic material;
   (c) placing on a conductive current distributor a first layer of said electrochemically active material and a second layer of said hydrophobic material over said first layer to produce an unbonded electrode;
   (d) applying a pressure of 0.1 to 5 tons per square inch on the face area of the unbonded electrode in step (c) so as to only lock said first layer, said second layer and said conductive current distributor together to produce an electrode assembly; and
   (e) roll-bonding said assembly of step (d) between counter-rotating rollers so as to exert a linear force pressure of from 0.1 to 10 tons per linear inch on said electrode assembly to produce a bonded electrode.

2. The process of claim 1 wherein a pore-former is included in at least one of the layers selected from the group consisting of said first layer and said second layer and wherein after step (e) the following step is added:
   (f) removing said pore-former from the bonded electrode.

3. The process of claim 1 wherein step (e) is repeated at least once.

4. The process of claim 2 wherein step (e) is repeated at least once.

5. The process of claims 1, 2, 3 or 4 wherein in step (a) said first layer comprises activated carbon and polytetrafluoroethylene.

6. The process of claims 1, 2, 3 or 4 wherein in step (b) said second layer comprises polytetrafluoroethylene.

7. The process of claims 1, 2, 3 or 4 wherein said conductive current distributor in step (c) is a material selected from the group consisting of metals, metal alloys, metals plated with noble metals, and alloys plated with noble metals.

8. An electrode made by the process of claims 1, 2, 3 or 4 and characterized by said bonded electrode having a disbond strength of about 5 to 30 pounds per square inch.

* * * * *